United States Patent [19]

Fearon

[11] 4,230,045
[45] Oct. 28, 1980

[54] METHOD AND SYSTEM FOR INCREASING THE TRACK-TO-WHEEL FRICTION OF THE WHEELS OF A LOCOMOTIVE FOR MOTIVE POWER AND DECREASING THE ROLLING RESISTANCE FOR TRAILING LOADS

[75] Inventor: Joseph G. Fearon, Boise, Id.

[73] Assignee: Morrison-Knudsen Company, Inc., Boise, Id.

[21] Appl. No.: 940,460

[22] Filed: Sep. 7, 1978

[51] Int. Cl.³ .............................................. B61F 19/00
[52] U.S. Cl. .................................... 104/279; 239/174; 291/1
[58] Field of Search ................ 104/279; 239/599, 173, 239/174, DIG. 19; 291/1; 118/307

[56] References Cited

U.S. PATENT DOCUMENTS

| | | | |
|---|---|---|---|
| 77,602 | 5/1868 | Floyd | 291/1 |
| 490,269 | 1/1893 | Chisholm | 291/1 |
| 893,878 | 7/1908 | Shires | 291/1 |
| 1,824,067 | 9/1931 | Becker | 239/173 |
| 2,597,719 | 5/1952 | Foster | 104/279 |
| 2,890,970 | 6/1959 | Allen | 291/1 |
| 3,659,787 | 5/1972 | Ito | 239/599 |

FOREIGN PATENT DOCUMENTS 833643 10/1938 France .......................................... 291/1

OTHER PUBLICATIONS

"Adhesion Without Sound," *Railway Age*, 11/1955.

*Primary Examiner*—John J. Love
*Assistant Examiner*—Ross Weaver
*Attorney, Agent, or Firm*—Seed, Berry, Vernon & Baynham

[57] ABSTRACT

A method and system for maximizing the track-to-wheel adhesion and minimizing the rolling resistance of the wheels of a locomotive is disclosed. A low volume of high pressure water, alone or in admixture with wetting agents, cleaning agents, etc. is sprayed onto the wheel contact surface of the rail forward of the driven wheels of the locomotives at very high pressures, i.e. 4,000 to 6,000 psi. followed immediately by ejecting air or other gas under pressure onto the wheel contact surface of the rail to dry the contact surface. The combination of high pressure water and air provides effective cleaning of the contact surfaces of the rail, thereby (1) increasing the friction between the driven wheels and the track; (2) lessening the draft effort of the locomotive driving the wheels of the train; (3) minimizing the wearing of both rails and the wheel surfaces by eliminating the use of abrasive materials, such as sand; (4) improving track condition; (5) increasing train braking capability; (6) lessening contamination of rail bed ballast; and (7) lessening energy consumption for movement of the train.

7 Claims, 4 Drawing Figures

METHOD AND SYSTEM FOR INCREASING THE TRACK-TO-WHEEL FRICTION OF THE WHEELS OF A LOCOMOTIVE FOR MOTIVE POWER AND DECREASING THE ROLLING RESISTANCE FOR TRAILING LOADS

BACKGROUND OF THE INVENTION

1. Field of the Invention

This invention is directed to a method and system for imroving the wheel slip system of locomotives.

2. Description of the Prior Art

Loss of adhesion of locomotive wheels in contact with the rails on which they ride can be due to a number of causes, such as an accumulation of oil on the tracks, frosty conditions, etc. When traction conditions decrease, more power and energy are necessary to cope with the rail conditions. Sand has been the most commonly used aid for bad or slippery rail conditions; however, the use of sand is both expensive and inconvenient. Sand must be dried and kept dry for handling. Expensive facilities for sand must be built and maintained. More importantly, the use of sand is detrimental to the rails and wheels of the locomotives due to abrasion. Sand also results in fouling of the rail ballast in those areas where it is excessively used.

Air, liquids, molten glass, oil and steam have been tried for cleaning of rails to improve the adhesion of rails to the contact surface of the rail. Dean et al. U.S. Pat. No. 2,853,957, discloses reducing the rail-to-wheel resistance by passing an electrical current through a plurality of rail- to-wheel contact zones. Bleil, U.S. Pat. No. 3,850,691 discloses a process for cleaning the rails and improving the traction of a locomotive wheel on a railroad rail by heating a normally solid, friable, abrasive composition to the molten state and depositing it as a coating on the wheel contacting surface of the rail. Bevin, U.S. Pat. No. 440,690 teaches a means of removing sand from the rails immediately after the drivers of the locomotive have passed over the sand by providing an air blast at the rear of the drivers which blows air under pressure against the rails. Floyd, U.S. Pat. No. 77,602 teaches ejecting a jet of steam upon the rails by means of a nozzle directly in front of the wheels of the locomotive to remove snow, ice, oil, grease or other similar substances which interfere with the grip of the wheels on the surface of the rails. Chisholm, U.S. Pat. No. 490,269 teaches removing dust and debris from the surface of the rails of an electric road by directing air upon the track directly in front of the wheels of the moving car. Shires, U.S. Pat. No. 893,878 teaches delivering heated air under pressure to the rails in front of the forward wheels of the locomotive to remove ice, sand, snow or other articles from the rails. Foster, U.S. Pat. No. 2,597,719 teaches delivering high pressure air onto the top of the rail surface in such a way as to clean the surface of snow or other foreigh matter so that sand can be directly applied on top of the rail.

SUMMARY OF THE INVENTION

A primary object of this invention is to provide a method and system for improving the wheel slippage of a locomotive by cleaning the wheel-contact surface of the rails to maximize the track-to-wheel adhesion of the driven wheels of a locomotive contacting the rails and minimize the rolling resistance for trailing loads.

Another object of this invention is to provide a method and system for improving the braking capability of locomotives.

A further object of this invention is to provide a method and system for increasing the friction between the wheels of a locomotive and the wheel contact surfaces of the rails to obtain a greater locomotive draw bar force.

A further object of this invention is to provide a method and system providing longer wearing of both rail and wheel surfaces by elimination of the use of abrasive materials on metal-to-metal contact surfaces.

These and other objects are accomplished by a method and system for ejecting a low volume of very high pressure water against the wheel contact surface of the rail immediately forward of the driven wheels of a locomotive, followed by ejecting pressurized gas or air onto the contact surface of the rails immediately following the water jet and forward of the driven wheels of the locomotive, the combination of high pressure water and air conditioning the wheel contact surface of the rail for maximum adhesion and minimum rolling resistance.

DETAILED DESCRIPTION OF THE PREFERRED EMBODIMENTS

Figure 1:
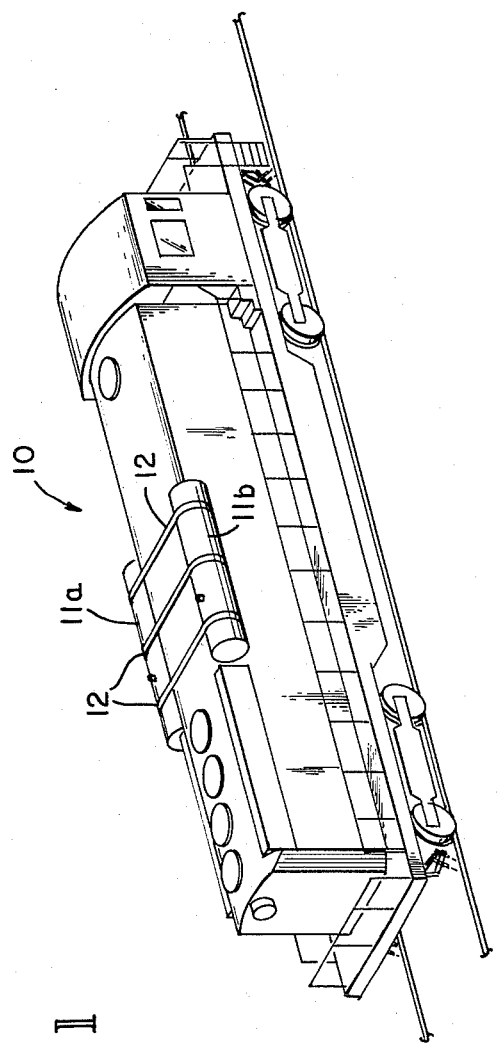
FIG. 1 is a perspective view of a locomotive incorporating the system claimed.

FIG. 1 illustrates a side view of a typical locomotive 10 incorporating the system claimed. The nozzle systems for ejecting water and air onto the wheel contact surfaces of the rails are preferably located immediately forward of the driven wheels of the locomotive, both fore and aft. In this way, the track can be cleaned, whatever direction the locomotive is traveling.

Figure 2:
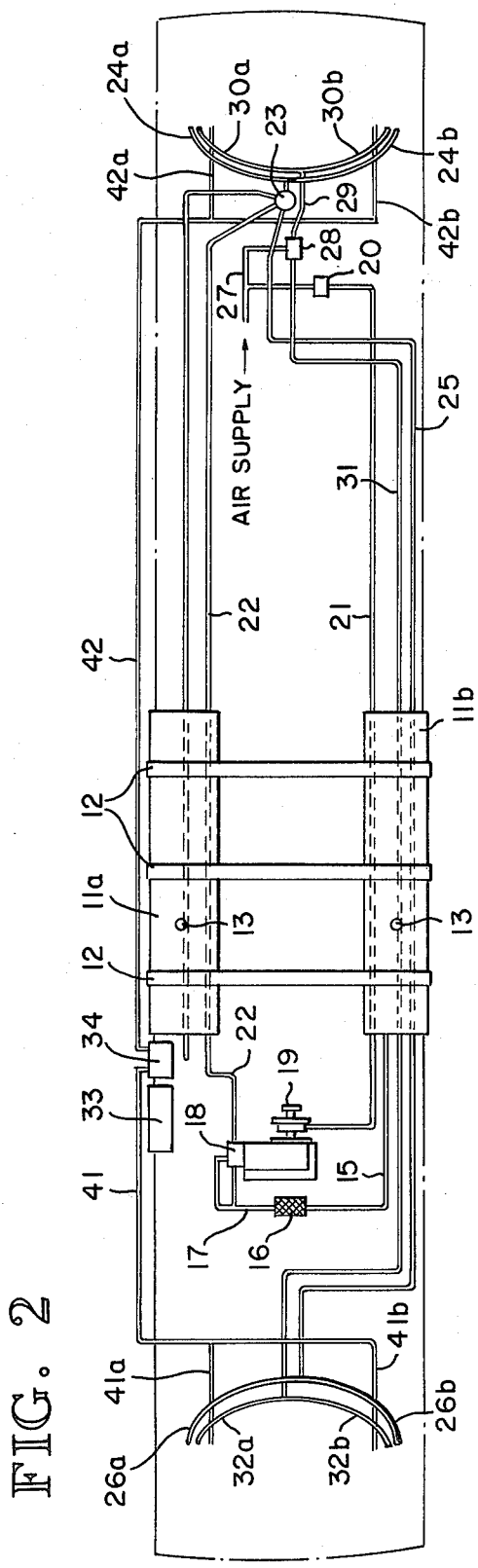
FIG. 2 is a schematic view of a locomotive illustrating the system claimed.

FIG. 2 schematically illustrates the system. The controls for the system are conveniently located in the cab of the locomotive so that they can be readily operated by the operator of the locomotive. The system can be installed on existing, conventional locomotives without extensive modification. The nozzle jet assemblies for ejection of water, air and/or detergent takes the place of the sand ejecting assembly present on most locomotives and can be secured to the sand tube which is generally present, as will be described in further detail. Referring to FIG. 2, two water tanks 11a and 11b, each having a diameter of about 2½ feet and a length of 12 feet are strapped together by endless straps 12 over the cowl of the locomotive 10 as illustrated in FIG. 1. The two tanks have capacity in excess of 700 gallons. Each tank is filled from the top through a filler opening 13. The water drains from each tank through a drain opening 14 in the lower end of each tank. The drains of each tank are preferably connected together by a line (not shown). The water drains by gravity from the tanks 11a and 11b through the respective drain openings into line 15 connected to a filter 16 for removal of any particulate matter contained in the water in the tanks. The water leaving filter 16 through line 17 enters pump 18. Pump 18 is a high pressure pump capable of increasing the pressure of water delivered to it to from 4,000 to 6,000 psi. The pump is driven from the locomotive engine through an air clutch 19. The pump remains idle until the air clutch is engaged by the operator in the cab. Referring to the schematic in FIG. 2, the air clutch 19 is engaged by compressed air from the compressor of the locomotive entering line 21 through valve 20 operated by the operator in the cab. A sprocket on the clutch is driven by a belt driven from the locomotive. Although various types of pumps may be used, one which is particularly suited for this use is a reciprocating triplex plunger pump of horizontal design manufactured by Pumpenfabrik Urach of the Federal Republic of West Germany. A valve (not shown) may be interposed between the water tanks and the pump to cut off the water supply to the pump. The pump is preferably fitted with a gauge indicating the pressure of the water being discharged from the pump. The pump may also include a regulator for regulating the discharge pressure of the water. A pulsation dampener (not shown) is preferably inserted in the discharge line from the pump to eliminate pressure pulsations. The water is discharged from the pump through line 22 to valve 23 located in the cab of the locomotive. Valve 23 is a four-way high pressure water selector valve which the operator can operate to deliver high pressure water to the aft jet nozzles through lines 24a and 24b or to the forward jet nozzles through high pressure lines 25, 26a and 26b.

Compressed air or other gas is delivered to the jet nozzles immediately following the water jet nozzles, as will be discussed, through air supply line 27 connected to the air compressor of the locomotive. Line 27 connects with valve 28 located in the cab of the locomotive. Valve 28 is a three-way valve allowing the operator of the locomotive to direct compressed air to the forward air jet nozzles through lines 29, 30a and 30b or to the aft air jet nozzles through lines 31, 32a and 32b.

Figure 4:
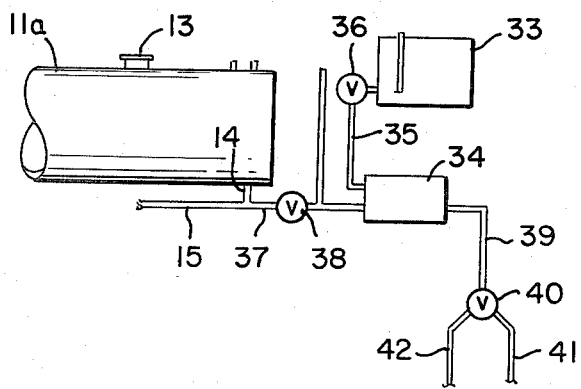
FIG. 4 is a schematic view of the supply tanks for the system.

If desired, other additives such as liquid detergents and/or liquid degreasers may be ejected onto the wheel contact surfaces of the rails with the air. Referring to FIG. 4, an additive tank 33 is provided which is connected to a mixing float tank 34 by line 35. The amount of additive allowed to flow into the mixing float tank by gravity is controlled by valve 36 interposed in line 35. Water from water tanks 11a and 11b enters the float mixing tank 34 through line 37 with the amount of water controlled by valve 38. The water with the additive added leaves float tank 34 through line 39 and flows by gravity through valve 40 which controls delivery of the additive to the forward end of the locomotive or the aft end of the locomotive through lines 41 and 42, respectively. The additive flows to the respective air jet nozzles by gravity with the amount and volume of additives controlled by valves 36 and 38.

Figure 3:
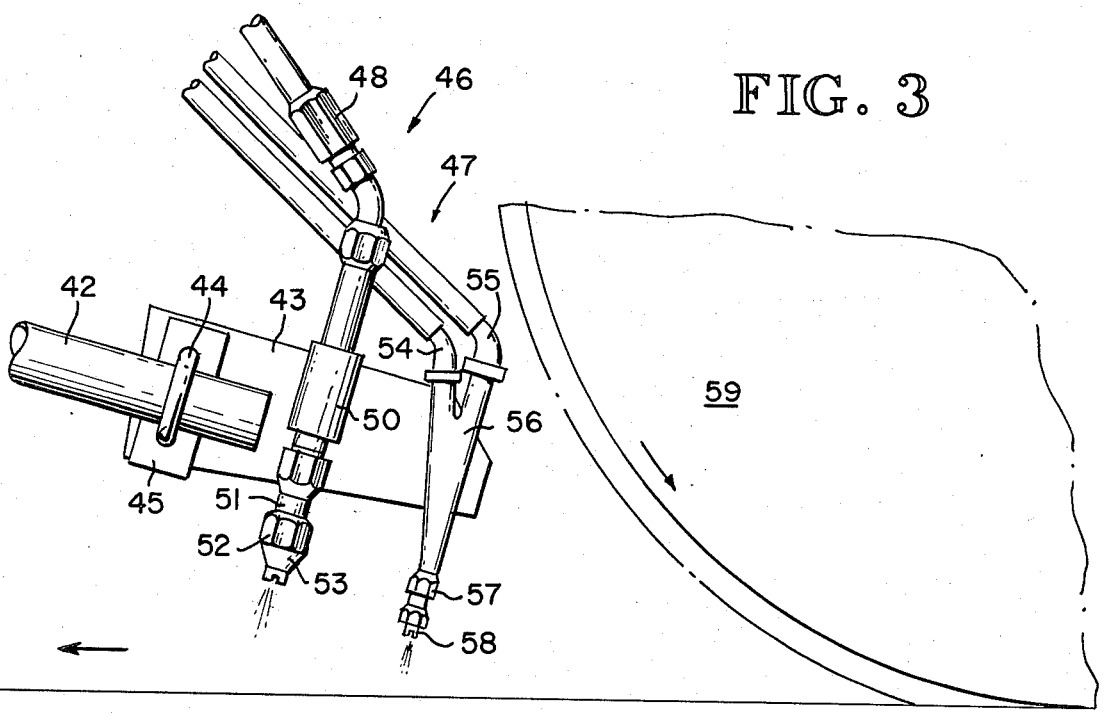
FIG. 3 is a side view illustrating positioning of the nozzles of the system in relation to the track and wheels of a locomotive.

FIG. 3 is a side elevational view of the air and water jet nozzles illustrating their position in relation to the contact surface of the rails and wheels of the locomotive. For convenience, the jet nozzle assemblies are secured to the sand tubes 42 present on most locomotives after removal of the hose delivering sand to the sand tube. A bracket 43 has a U bolt 44 at one end thereof extending through openings in the bracket adapted to receive the respective legs of the U bolt and clamp the bracket to the sand tube. A spacer 45 may be used for proper adjustment of the jet assembly in relation to the contact surfaces on the rails. The water jet nozzle assembly 46 and air/additive jet nozzle assembly 47 are secured to the bracket 43. High pressure water from pump 18 is delivered to the respective water jet nozzle assemblies for each set of driven wheels through lines 24a, 24b, 26a and 26b. A hose adapter 48 connects to pipe 49 with a threaded fitting. Pipe 49 is held in an adjustable position in relation to the bracket 43 by sleeve 50 which has a cap screw (not shown) welded to it. The sleeve 50 is held in adjustable position in relation to the bracket by a nut and lock washer (not shown). An Allen set screw in the sleeve 50 allows vertical and rotary adjustment of the respective water jet assemblies. A filter may be encased by the body 51 of the jet nozzle and held in place by cap 52. Cap 52 also holds the water jet nozzle 53 which spreads a fan of high pressure water over the wheel contact surface of the rail. Because of the extremely high pressures of water used, the water jet nozzles must be made of a material which can withstand the high pressures employed over an extended length of time. A tungsten carbide Vee-jet nozzle is preferably used.

Referring now to the air jet nozzle assembly 47, the respective air lines 31a, 31b, and 30a, 30b, and gravity flow additive lines 41a, 41b, and 42a, 42b are secured over elbow members 54 and 55 threaded to a venturi adapter 56. The venturi adapter is secured to bracket 43 by a cap screw threaded to the adapter 56 in a similar manner as described with regard to the water jet nozzle assembly 46. A reducer 57 is threaded to the terminating end of the venturi adapter 56 and a jet nozzle 58 is threaded to the reducer.

Both nozzle jet assemblies 46 and 47 are positioned within 1 to 6 inches of the respective driven wheels 59 of the locomotive and within 1 to 6 inches above the respective rails 63 on which the wheels ride.

To operate the system the main water tanks 11 are filled with water. The additive tank 33, if it is to be used, is filled with a detergent, deicer, degreaser or any other desired liquid to be mixed with water through the float tank 34. The valve 36 leading from the additive tank is not opened until application of the additive is desired. For normal cleaning of the wheel contact surfaces of the rails the high pressure water valve 23 is opened to deliver high pressure water to the jet nozzles immediately forward of the wheels of the locomotive in the direction in which the locomotive is moving and the air valve 28 is also opened to deliver air to the jets immediately behind the water jets. If the direction of the locomotive is reversed the position of the water and air valves is changed to deliver water and air to the opposite set of jet nozzle assemblies at the other end of the locomotive. When it is desired to not increase traction, high pressure water alone may be ejected onto the wheel contact surfaces of the tracks to aid in degreasing of the wheels of the locomotive and the wheel contact surfaces of the tracks. At other times it may be desirable to eject air alone onto the wheel contact surfaces of the tracks, particularly when the wheel contact surfaces have free water standing on them and additional traction is needed. The air ejected onto the wheel contact surfaces dries the tracks and provides the necessary traction. During extremely cold weather when frost and snow abound, the water and/or air ejected onto the wheel contact surfaces of the rails may be heated to aid in eliminating any frost or snow accumulating on the wheel contact surfaces of the rails. When an additive is used, the valves 36 and 38 are adjusted to allow the additive and water into the float tank 34 and the valve 40 is adjusted to deliver the water containing the additive to either forward or aft of the locomotive. There are several different ways that greasy or oily tracks can be cleaned. One way is to run a detergent additive through the air nozzle assembly at the forward end of a locomotive and high pressure water through the rear nozzle jets.

The system described which makes use of a small amount of water at extremely high pressure directed onto the wheel contact surfaces of rails followed by drying of the contact surfaces with air or other gas for improving adhesion of the wheels of the locomotive to the rails and reducing the rolling resistance of the trailing loads. This is of extreme importance to railroads not only in terms of energy savings but in their ability to pull a greater load for a given amount of power. Tests using the assembly illustrated have proved that not only is good performance obtained from an adhesion standpoint but reduced rolling resistance is accomplished not only with the wheels of the locomotive but also the trailing cars. Use of the assembly has enabled reduction of the draw bar pull required on a 100 car freight train, thus enabling great savings in fuel and reduced wheel and rail wear. Additionally the entire system is both environmentally safe and pollution free. It eliminates entirely the need for use of sand which is conventionally used in most locomotives today for improving adhesion. It presents the wheels of the locomotive the best possible surface for contact.

I claim:

1. A system for maximizing the track-to-wheel adhesion and minimizing the rolling resistance of the wheels of a locomotive, comprising:
   a jet nozzle positioned directly above the contact surface of the track immediately forward of the driven wheels of the locomotive;
   a high pressure pump connected to the nozzle assembly delivering water at a pressure of at least 4,000 psi to the jet nozzle,
   water storage means holding a supply of water for delivery to the high pressure pump,
   valve control means controlling the delivery of water to the jet nozzle, and
   means for ejecting a high pressure gas onto the same contact surface of the rails forward of the driven wheels of the locomotive and immediately following the means for ejecting high pressure water for drying and conditioning the wheel contact surfaces of the rail to assure maximum adhesion of the locomotive wheels thereto and minimize the rolling resistance of the locomotive wheels thereon.

2. The system of claim 1 including nozzle means for ejecting an additive onto the wheel contact surfaces for conditioning thereof.

3. The system of claim 2 wherein the additive is ejected simultaneously with the high pressure gas onto the wheel contact surfaces.

4. A system for maximizing the track-to-wheel adhesion and minimizing the rolling resistance of the wheels of a railroad locomotive riding along a track comprising:
   a supply tank holding water,
   a high pressure pump receiving water from the tank and discharging the water at a pressure of at least 4,000 psi,
   power means operatively connected to the pump to drive the same,
   water jet nozzles, one above each rail mounted forward of each of the driven wheels of the locomotive for receiving and ejecting the high pressure water discharged from the pump onto the respective wheel contact surfaces of the rails,
   first valve means intermediate the pump and jet nozzles for controlling delivery of the high pressure water to the nozzles,
   means providing a source of pressurized air,
   air jet nozzles, one above each rail directly adjacent the water jet nozzles, the air jet nozzles connected to the source of pressurized air for delivery of air under pressure forward of the driven wheels of the locomotive immediately following the water jet nozzles to remove the water from the wheel contact surfaces of the rails ejected from the first pair of nozzles,
   second valve means intermediate the air jet of nozzles and source of pressurized air controlling delivery of air to the air jet nozzles, and
   means for metering an additive for conditioning of the wheel contact surfaces into the pressurized air stream just ahead of the air jet nozzles.

5. The system of claim 4 wherein the water jet nozzles are of tungsten carbide delivering high pressure water therethrough in a 25° fan configuration, the water completely atomizing over the wheel contact surfaces of the respective rails.

6. The system of claim 4 including an additive tank holding the additive to be supplied to the wheel contacting surfaces of the rails.

7. The system of claim 4 wherein the vertical distances of the water and air jet nozzles from the wheel contact surfaces of the rails ranges from 1 to 6 inches and the distance of the water and air jet nozzle from the wheels of the locomotive ranges from 1 to 6 inches.

* * * * *